US009362034B2

(12) United States Patent
Kim et al.

(10) Patent No.: US 9,362,034 B2
(45) Date of Patent: Jun. 7, 2016

(54) METHOD OF PREPARING CORE-SHELL STRUCTURED NANOPARTICLE HAVING HARD-SOFT MAGNETIC HETEROSTRUCTURE

(71) Applicants: LG ELECTRONICS INC., Seoul (KR); INDUSTRY-UNIVERSITY COOPERATION FOUNDATION HANYANG UNIVERSITY ERICA CAMPUS, Ansan-si, Gyeonggi-do (KR)

(72) Inventors: Jongryoul Kim, Ansan-si (KR); Jinbae Kim, Gunpo-si (KR); Namseok Kang, Seongnam-si (KR); Sanggeun Cho, Ansan-si (KR)

(73) Assignees: LG ELECTRONICS INC., Seoul (KR); INDUSTRY-UNIVERSITY COOPERATION FOUNDATION HANYANG UNIVERSITY ERICA CAMPUS, Ansan-si, Gyeonggi-do (KR)

( * ) Notice: Subject to any disclaimer, the term of this patent is extended or adjusted under 35 U.S.C. 154(b) by 132 days.

(21) Appl. No.: 14/348,507

(22) PCT Filed: Jan. 9, 2013

(86) PCT No.: PCT/KR2013/000161
§ 371 (c)(1),
(2) Date: Mar. 28, 2014

(87) PCT Pub. No.: WO2013/115495
PCT Pub. Date: Aug. 8, 2013

(65) Prior Publication Data
US 2014/0225024 A1 Aug. 14, 2014

(30) Foreign Application Priority Data
Feb. 3, 2012 (KR) ........................ 10-2012-0011406

(51) Int. Cl.
*H01F 1/06* (2006.01)
*H01F 1/047* (2006.01)
(Continued)

(52) U.S. Cl.
CPC ............ *H01F 1/0315* (2013.01); *H01F 1/0306* (2013.01); *H01F 1/08* (2013.01); *H01F 1/112* (2013.01); *H01F 1/113* (2013.01); *H01F 41/0266* (2013.01); *H01F 1/0579* (2013.01)

(58) Field of Classification Search
CPC ......... H01F 1/0054; H01F 1/061; H01F 1/06; H01F 1/083; H01F 1/086; H01F 1/09; H01F 1/11; H01F 1/113; H01F 41/02
See application file for complete search history.

(56) References Cited

U.S. PATENT DOCUMENTS 6,972,046 B2 12/2005 Sun et al.
7,217,328 B2 5/2007 Nishiuchi et al.
(Continued)

FOREIGN PATENT DOCUMENTS

CN 1483207 A 3/2004
CN 101563735 A 10/2009
(Continued)

OTHER PUBLICATIONS

Chen et al., "Absorbing Properties Investigation of SrFe12O19-NiFe2O4 Composite Nanopowders with Core-shell Structure", Journal of Composites, vol. 29, No. 1 (2012) pp. 111-116.
(Continued)

*Primary Examiner* — Carol M Koslow
(74) *Attorney, Agent, or Firm* — Birch, Stewart, Kolasch & Birch, LLP

(57) ABSTRACT

The present invention relates to a core-shell structured nanoparticle having hard-soft heterostructure, magnet prepared from the nanoparticle, and preparing method thereof. The core-shell structured nanoparticle having hard-soft magnetic heterostructure of present invention has some merits such as independence from resource supply problem of rare earth elements and low price and can overcome physical and magnetic limitations possessed by the conventional ferrite mono-phased material.

7 Claims, 4 Drawing Sheets

(51) Int. Cl.

| | |
|---|---|
| ***B82B 3/00*** | (2006.01) |
| ***H01F 1/03*** | (2006.01) |
| ***H01F 41/02*** | (2006.01) |
| ***H01F 1/08*** | (2006.01) |
| ***H01F 1/11*** | (2006.01) |
| ***H01F 1/113*** | (2006.01) |
| *H01F 1/057* | (2006.01) |

(56) References Cited

U.S. PATENT DOCUMENTS

| | | | | |
|---|---|---|---|---|
| 7,547,400 | B1 | 6/2009 | Carpenter et al. | |
| 2006/0005898 | A1 | 1/2006 | Liu et al. | |
| 2006/0105170 | A1 | 5/2006 | Dobson et al. | |
| 2010/0104767 | A1 * | 4/2010 | Sskuma .................. | B22F 1/025 427/535 |
| 2011/0027588 | A1 * | 2/2011 | Hattori .................... | B22F 1/025 428/403 |

FOREIGN PATENT DOCUMENTS

| | | | | |
|---|---|---|---|---|
| CN | 102142309 | A | | 8/2011 |
| KR | 10-2010-0029428 | A | | 10/2011 |
| WO | WO 2012/068178 | | * | 5/2012 |

OTHER PUBLICATIONS

Chinese Office Action issued in Chinese Patent Application No. 201380003534.3 on Mar. 3, 2016.

* cited by examiner

METHOD OF PREPARING CORE-SHELL STRUCTURED NANOPARTICLE HAVING HARD-SOFT MAGNETIC HETEROSTRUCTURE

TECHNICAL FIELD

The present invention relates to a core-shell structured nanoparticle having hard-soft hetero-structure, magnet prepared with said nanoparticle, and preparing method thereof.

BACKGROUND ART

Neodymium magnet is a sintered product comprising neodymium (Nd), iron oxide (Fe), and Boron (B) as main components, which is featured by very excellent magnetic property. Although demand for this high property neodymium bulk magnet has increased, imbalance of demand and supply of the rare-earth elements obstructs supply of high performance motor necessary for next generation industry.

Samarium cobalt magnet which comprises samarium and cobalt as main component is known to have very excellent magnetic property next to the neodymium magnet, but the problem of demand and supply of samarium, one of rare-earth elements, also causes rise of production cost.

Ferrite magnet is a low priced magnet with stable magnetic property which is used when strong magnetic force is not required. Ferrite magnet is produced by powder metallurgy in general, and usually black colored. The chemical form of ferrite magnet is $XO+Fe_2O_3$, wherein X may be barium or strontium depending on its uses. The ferrite magnet is classified into the dry-processed or wet-processed according to its manufacturing methods, or into the isotropic or anisotropic according to its magnetic direction. The ferrite magnet is a compound consisting of oxides, therefore it is an insulator and has almost no loss of high frequency such as excessive current loss, even if it is operated in a magnetic field of high frequency. The isotropic magnet has lower magnetic force than anisotropic, but has several advantages such as low price and free attachment. The ferrite magnet has been used in diverse applications such as D.C motor, compass, telephone, tachometer, speaker, speed meter, TV, reed switch, and clock movement, and has several advantages such as its light weight and low price. However, the ferrite magnet has also a disadvantage that it does not show an excellent magnetic property enough to substitute high priced neodymium bulk magnet.

Meanwhile, a core-shell structured nanoparticle means a material having a structure where a shell substance surrounds a core substance located in the center. As the core-shell structured nanoparticle provides multifunctional nano-materials having at least two (2) properties depending on the properties of the substances contained in each layer, there have been a number of researches and developments on the core-shell structured nanoparticles by providing different combinations of metal-metal, metal-ceramic, metal-organic, and organic-organic structure. It has been known that the core-shell structured nanoparticles has a high applicability to various areas due to its combined functionalities of magnetic, fluorescent, acid-resistant, and anti-abrasion property.

Until now, there has been a limitation to the substances contained in a core or shell structure, and most of the researches have been done on these limited substances only. Under this situation, it is considered that there are great future possibilities in re-searching and developing a new core-shell structured nanoparticle by exploring new substances besides the one conventionally researched so far, and combining these materials, thereby providing new properties.

Methods to obtain core-shell structured nano-particle powder include co-precipitation, spraying, electrolysis and sol-gel method, and reverse micelle method.

For instance, U.S. Pat. No. 7,547,400 uses a reverse micelle method to prepare a nano-sized nickel-zinc ferrite and Korea Patent Application No. 10-2010-0029428 uses a sol-gel method to prepare nano-iron powder.

Among these, Korea Patent Application No. 10-2010-0029428 embodies a core-shell dual structure, but this invention shows limited physical and magnetic properties like conventional soft magnetic material, since both of the core and shell consist of soft magnetic substances only.

Throughout the present application, several patents and publications are referenced and citations are provided. The disclosure of these patents and publications is incorporated into the present application in order to more fully describe this invention and the state of the art to which this invention pertains.

DISCLOSURE OF INVENTION

Technical Problem

Inventors of the present invention have studied and given effort to develop a noble magnetic material with high property able to substitute expensive rare earth element bulk magnets and completed the present invention by preparing a core-shell structured nanoparticle having hard-soft magnetic hetero-structure successfully. Accordingly, an object of the present invention is to provide a noble core-shell structured nanoparticle having hard-soft magnetic heterostructure.

Another object of the present invention is to provide a method to prepare the above core-shell structured nanoparticle having hard-soft magnetic heterostructure.

Another object of the present invention is to provide a magnet prepared by using the above core-shell structured nanoparticle having hard-soft magnetic heterostructure.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

Solution to Problem

An objective of the present invention is to provide a core-shell structured nanoparticle having hard-soft magnetic heterostructure wherein a soft magnetic shell surrounds a hard magnetic core.

The inventors of present invention have studied and given efforts to develop a high performance magnetic material exceeding the existing mantic material of ferrite by materializing both high coercive force and high saturation flux density. In the above process, we focused on the point that when simply mixing hard magnetic nano-powder such as ferrite and soft magnetic nano-powder including metals such as iron, cobalt, and nickel, 2 phased magnetic graph as shown in FIG. 3 was obtained rather than materializing both good coercive force and saturation flux density at same time and have sought how to connect interface between the above two magnetic materials smoothly. As a result, we completed the present invention by preparing successfully a core-shell structured nanoparticle having hard-soft heterostructure to materialize both the hard magnetic material and the soft magnetic material within a nanoparticle at same time.

The above nanoparticle of present invention is featured by materializing both good coercive force and saturation flux density at same time as shown in FIG. 2, different from the conventional simple mixing of hard and soft magnetic nanopower.

In the core-shell structured nanoparticle having hard-soft heterostructure of the present invention, the above core is featured by including at least 1 type of hard magnetic material, and preferably includes ferrite as its main ingredient, which has merits such as high curie temperature, coercive force, chemical stability, corrosion resistance, and low price.

In a preferred embodiment, the above ferrite may use nanosized magnetoplumbite (M type) crystal structure or W type barium ferrite, strontium ferrite, cobalt ferrite, or these combination.

In the core-shell structured nanoparticle having hard-soft heterostructure of the present invention, the above shell is featured by including at least 1 type of soft magnetic material, and for instance may include at least one metal or metal compound.

In an embodiment, the above soft magnetic shell is featured by including at least one type of metal or metal compound selected from the group consisting of Fe, Co, Ni, $Fe_3B$, FeCo, $Fe_{16}N_2$, FeNi, $Fe_3O_4$, FeSi and CoNi.

In the present invention, the magnetic property can be controlled properly depending on the ratio of the above hard magnetic core and the soft magnetic shell within the whole nanoparticle. For instance, when the ratio of the hard magnetic core within the whole nanoparticle of the present invention increases, the coercive force increases further, but the possible saturation flux density decreases. On the contrary, when the ratio of the soft magnetic shell within the whole nanoparticle increases, the resulting coercive force decreases, but the saturation flux density increases.

In a preferred embodiment of the present invention, the above soft shell is included as 5 to 80 wt % of content in the whole nanoparticle.

These contents ratio between the hard magnetic core and the soft magnetic shell can be controlled easily depending on how much hard magnetic and soft magnetic ingredients are included in the final solution to prepare the nanoparticle of present invention.

Diameter of the complex nanoparticle of the present invention is no more than 1000 nm, preferably is 10 to 1000 nm, and more preferably is featured by being 70 to 500 nm.

In a preferred embodiment, the complex nanoparticle of present invention is featured by having a core-shell structure where an alpha iron shell surrounds at least one hard magnetic ferrite core selected from the group consisting of barium ferrite, strontium ferrite, and cobalt ferrite.

Another object of the present invention is to provide a method to prepare a core-shell structured nanoparticle having hard-soft heterostructure by using a sol-gel method, which is featured by including following steps comprising: (i) a step to obtain a slurry state solution containing at least one type of material selected from the group consisting of metal complex, metal salt, metal compound and metal nanoparticle and ferrite nanopowder; (ii) a step to change the above solution to a viscous gel from by making its solvent evaporated; and (iii) a step to produce a nanoparticle by heating the above gel.

The above sol-gel method is a process going through sol→gel→nanoparticle, wherein the sol means a dispersed colloid suspension without precipitation which is composed of particles sized at about 1 to 1000 nm and has negligible action of attraction or gravity, so is mainly affected by Van der Waals force or surface charge. This sol is altered to gel through hydrolysis and condensation. It is possible to obtain nanoparticle by heating the gel lost its fluidity unlike the sol. This preparation of material using the sol-gel method has some merits that it is possible to prepare a material with homogeneous composition and obtain a desired form by adjusting its composition and microstructure.

In order to prepare the nanoparticle having hard-soft magnetic heterostructure of the present invention, it is required that in the above step (i), both hard and soft magnetic material are dispersed together in the final solution which is slurry or suspension.

For instance, the above final solution in slurry state may include at least one type of ferrite nanoparticle selected from the group comprising barium ferrite, strontium ferrite, and cobalt ferrite as the above hard magnetic material and at least one type of material selected from the group comprising metal complex, metal salt, metal compound and metal nanopowder as the above soft magnetic material, and preferably may include at least one type of metal complex compound selected from the group comprising Fe-oleate and Fe-dodecanoate.

It is possible to adjust the content ratio between the hard magnetic core and the soft magnetic shell composing finally prepared nanoparticle depending on each content of the hard magnetic substance and the soft magnetic substance involved in the above final solution and control magnetic property materialized by the nanoparticle appropriately.

In the present invention, the above step (ii) can be performed by a method to alter the total solution to viscous gel type by making the solution in slurry state evaporated slowly via its vigorous agitating and heating.

The above step (iii) is a step to make the solvent evaporated completely and make the coating material absorbed completely, which can be performed by a method to make the solvent heated and combusted in the air to form powder.

The nanopowder of the present invention prepared by this sol-gel method can have a core-shell structure where the soft magnetic shell surrounds the hard magnetic core and materialize both high coercive force and high saturation flux density.

In case that the shell is composed of a metal compound in this prepared nanoparticle, adding a step to reduce the metal compound by thermal reduction has a merit that it is possible to secure better saturation magnetic property. Thus, the method of present invention described in a preferred embodiment is featured by including a step to perform thermal reduction additionally to the nanoparticle prepared in the above step (iii). The above thermal reduction can be performed by incubating the above prepared nanoparticle at high temperature hydrogen condition for a certain time and then annealing it.

Another object of the present invention is to provide a method to prepare a core-shell structure nanoparticle having hard-soft heterostructure by using a reverse micelle method, which is featured by including following steps comprising: (i) a step to obtain and agitate a mixture including metal salt, ferrite nanopowder, surfactant, hydrocarbon, and distilled water; and (ii) a step to form a nanoparticle by drying the above agitated solution rapidly.

The reverse micelle (RM) method, a field involved in surface chemistry, is a method to prepare a nanoparticle using a physicochemical property of surfactant. When solubilizing an aqueous solution with non-polar solvent (organic solvent), a reverse micelle (RM) is formed and a water pool is formed also in its inside, wherein the RM solution forms transparent, isotropic, and thermal stable micro-emulsion. In the above RM solution, an aqueous solution layer exists in dispersed state to nano-sized water pool and the water pool provides microenvironment necessary for preparing a nanoparticle due to its size and aqueous condition. When using this reverse-micelle method, it is possible to synthesize nanometer sized metal corpuscles with diverse form according to experimental condition of its composition. Like these, the RM is considered to be applied in various fields as a reactor for separation, transmission, chemistry and enzymatic reaction of substances and being used actively in preparing nanoparticle.

In order to prepare the nanoparticle having hard-soft magnetic heterostructure of the present invention, it is required that in the above step (i), both hard and soft magnetic material are dispersed together in the above mixture.

Preferably, ferrite nanopowder may be used as the above hard magnetic substance and various metal salts such as iron (Fe)-nitrate, monosodium ferric, iron-sulfate, diiron-trisulfate, cobalt nitrate, nickel carbonate, and nickel sulfate may be used as the soft magnetic substance.

It is possible to adjust the content ratio between the hard magnetic core and the soft magnetic shell composing finally prepared nanoparticle depending on each content of the hard magnetic substance and the soft magnetic substance involved in the above mixture used in the above step (i), so as to control magnetic property materialized by the nanoparticle appropriately.

The microenvironment of water pool can be refined depending on ingredients of the above used surfactant. For instance, at least one substance selected from the group comprising Sodium bis(2-ethylhexyl) sulfosuccinate, polyoxyethylene nonylphenyl ether, nonyl phenol ethosylate, and sodium dioctylsulfosuccinate may be used as an ingredient of the above sulfactant.

The above hydrocarbon is a solvent to form reverse micelle by solubilizing the aqueous solution; and non-polar solvent (organic solvent) is sufficient to be used limitlessly. For instance, at least one material selected from the group comprising cyclohexane, trimethylpetane, heptanes, octane, isooctane, decane, carbon tetrachloride, and benzene may be used as the above hydrocarbon.

The above step (iii) is a process to eliminate moisture through rapid drying and remove organic substances, which may be performed by spray-drying method, for instance.

In case that the shell is composed of a metal compound in this prepared nanoparticle, adding a step to reduce the metal compound by thermal reduction has a merit that it is possible to secure better saturation magnetic property. Thus in a preferred embodiment of present invention, the reverse micelle method may include additionally a step to perform thermal reduction to the nanoparticle after the above step (ii).

Another object of the present invention is to provide a magnet prepared with the core-shell structured nanoparticle having hard-soft magnetic heterostructure described in the above.

In an embodiment of the present invention, the above magnet may be a sintered magnet or a bonded magnet. The above sintered magnet can be prepared by sintering the core-shell structured nanoparticle having hard-soft magnetic heterostructure.

The above bonded magnet is called as resin magnet and can be prepared by mixing the nanoparticle having hard-soft magnetic heterostructure of the present invention with resin and then molding them via extrusion or injection.

The above sintered magnet can be prepared by 2-step process to sinter the nanoparticle having hard-soft magnetic heterostructure after its magnetic field molding. To the preparation of sintered magnet, a unified process of magnetic field molding and sintering as well as the above 2-step process may be applied.

Advantageous Effects of Invention

The core-shell structured nanoparticle having hard-soft magnetic heterostructure where the soft magnetic shell surrounds the hard magnetic core of present invention has some merits such as independence from supply problem of rare earth element and low price and can overcome physical and magnetic limitations possessed by the conventional ferrite mono-phased material.

BRIEF DESCRIPTION OF DRAWINGS

The accompanying drawings, which are included to provide a further understanding of the invention and are incorporated in and constitute a part of this specification, illustrate exemplary embodiments and together with the description serve to explain the principles of the invention.

In the drawings.

The foregoing embodiments and advantages are merely exemplary and are not to be construed as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

BEST MODE FOR CARRYING OUT THE INVENTION

The present invention will now be described in further detail by examples. It would be obvious to those skilled in the art that these examples are intended to be more concretely illustrative and the scope of the present invention as set forth in the appended claims is not limited to or by the examples.

EXAMPLE

Figure 5:
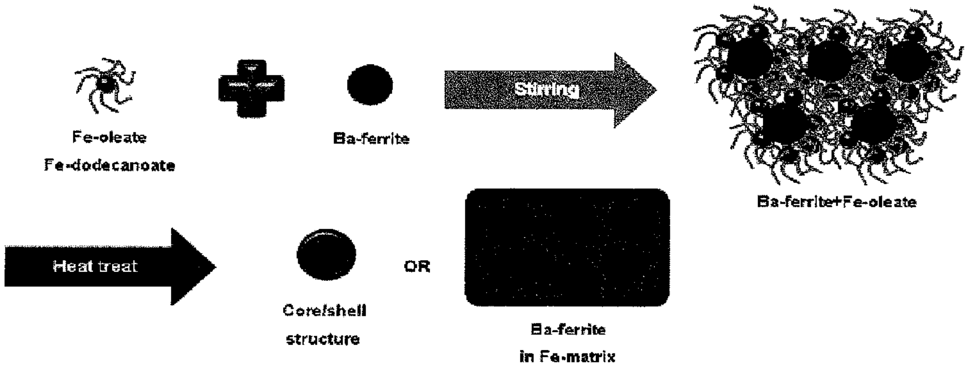
FIG. 5 is a diagram illustrating the method to prepare the core-shell structured nanoparticle having hard-soft magnetic heterostructure by using sol-gel coating method.

Preparation of Core-Shell Structured Nanoparticle Having Hard-Soft Magnetic Heterostructure Using Sol-Gel Coating Method According to the scheme illustrated in FIG. 5, the core-shell structured nanoparticle having hard-soft magnetic heterostructure was prepared by using a sol-gel method.

Concretely, a mixture solution was prepared by adding 2.16 g of Fe-oleate (SIGMA-ALDRICH) to 25 mL of ethanol and stirring them. Then, 20 mL of distilled water and 2.7 g of ferrite nanopowder (SIGMA-ALDRICH) were added and stirred to prepare a solution in slurry state.

These prepared solution of slurry state was heated at 70° C. during stirring to evaporate the solvent so that the solution is altered to powder. For complete absorption of the coating material, it was heated and dried in the air of 60° C. for 12 hr to form powder.

Then after raising the temperature by 10° C. per minute from room temperature to 450° C. under argon (Ar) atmosphere, reduction process was carried out to reduce the iron oxide which forms a cell to iron by incubation under hydrogen atmosphere of 450° C. for 1 hr. Then, a core-shell structured barium ferrite iron nanopowder was obtained by annealing the precursor powder.

Preparation of Core-Shell Structured Nanoparticle Having Hard-Soft Magnetic Heterostructure Using Reverse Micelle Method.

Figure 6:
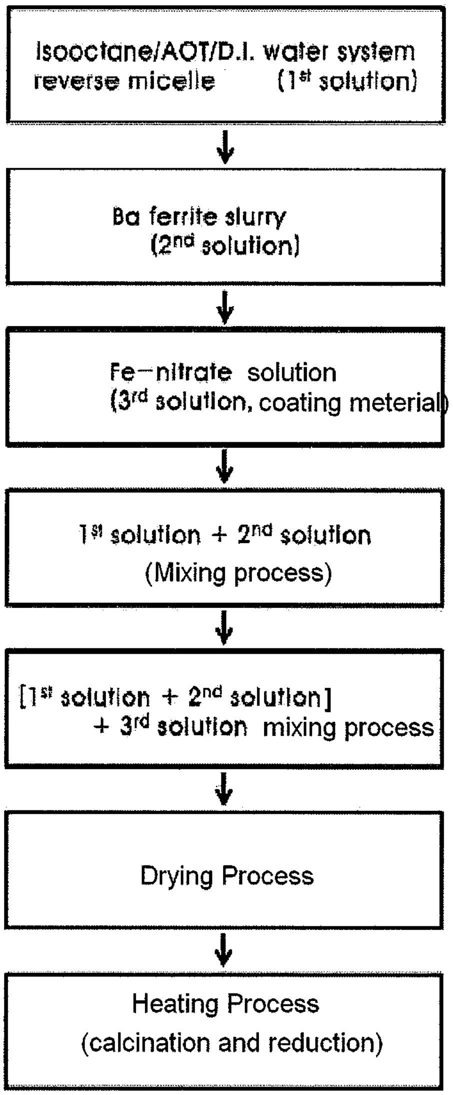
FIG. 6 is a diagram illustrating the method to prepare the core-shell structured nanoparticle having hard-soft magnetic heterostructure by using reverse micelle method.

According to the scheme illustrated in FIG. 6, the core-shell structured nanoparticle with hard-soft magnetic heterostructure was prepared by using a reverse micelle method.

Concretely, the first solution was prepared by mixing a solution containing isooctane and distilled water in 2:5 of mass ratio (distilled water 3 g, isooctane 22.5 g) with a surfactant, preferably sulfonate (Sodium bis(2-ethylhexyl) sulfosuccinate] (ALTA AESAR), wherein the concentration ratio between the distilled water and the surfactant [(D.W.)/(surfactant)] was adjusted to 5.

Separate from the above first solution, 0.1 g of barium ferrite was suspended to a slurry state to make 3 mL of the second solution.

Then, the third solution was prepared by adding and stirring 0.1 g of Fe-nitrate (SIGMA-ALDRICH) to be coated to 3 g of distilled water.

The final solution was obtained by adding the second solution to the first solution, stirring them using an ultrasonicator (SONICS, VCX-750), adding the third solution and then stirring them again using the ultrasonicator.

From the final solution, powder was obtained by hot wind drying under the condition of 300° C. and 10° C./min of temperature rising for 1 hr, in order to eliminate water by rapid drying and organic substances (AOTs) by heat treatment, followed by removal of organic materials and absorption of coating material.

Then after raising the temperature by 10° C. per minute from room temperature to 450° C. under argon (Ar) atmosphere, reduction process was carried out to reduce the iron oxide which forms a cell to iron by incubating under hydrogen atmosphere at 450° C. for 1 hr. Then, a core-shell structured barium ferrite iron nanopowder was obtained by annealing the precursor powder.

Analysis Using TEM (Transmission Electron Microscopy)

Shape and size of the core-shell structured barium ferrite-iron nanopowder were measured using TEM (Jeol, JEM2010).

After putting the prepared core-shell barium ferrite-iron nanopowder into ethanol and dispersing it with an ultrasonicator, small amount of it was dropped on a copper grid. Then, it was dried in the air to prepare a sample to be observed with TEM and its shape and size were measured using TEM.

Figure 1:
FIG. 1 is a TEM (Transmission Electron Microscope) image of the core-shell structured nanoparticle having hard-soft magnetic heterostructure prepared according to the present invention.

FIG. 1 is a photo showing a TEM image, where it is identified that due to good absorption of coating material composed of iron onto the barium ferrite core, a core-shell structure was formed completely and its diameter was measured as 70 to 500 nm.

Measurement of Magnetism

Figure 2:
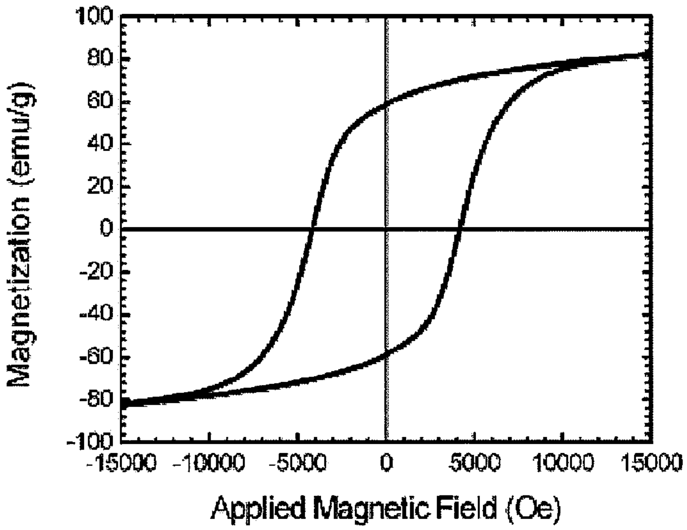
FIG. 2 is a graph obtained from magnetic measurement of the core-shell structured nanoparticle having hard-soft magnetic heterostructure prepared according to the present invention.
Figure 3:
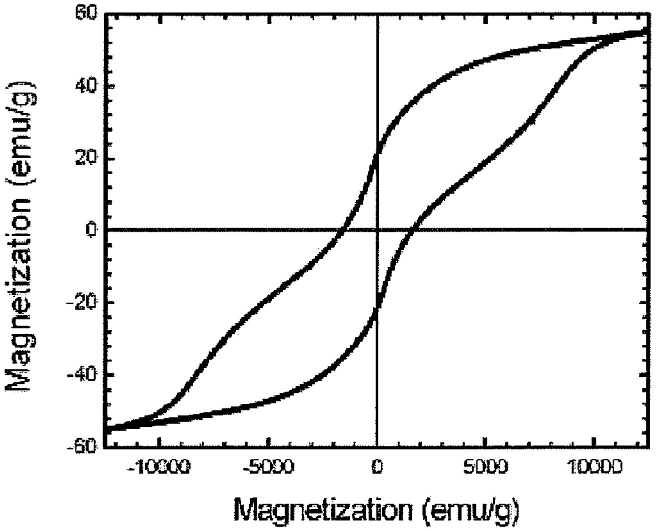
FIG. 3 is a graph obtained by magnetic measurement of simple mixing between hard and soft magnetic powder.
Figure 4:
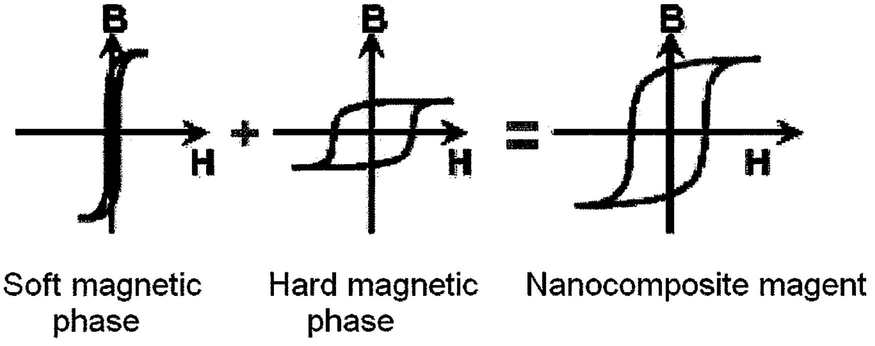
FIG. 4 is a diagram illustrating the principle that the core-shell structured nanoparticle having hard-soft magnetic heterostructure prepared according to the present invention have both good value of coercive force and saturation magnetic flux density at same time.

Magnetism of the prepared core-shell structured barium ferrite iron nanopowder was measured using VSM (vibration sample magnetometer, Toei, VSM-5) and its results were provided in FIG. 2.

As shown in FIG. 2, coercive force and saturation magnetization value of the prepared core-shell structured barium ferrite-iron nanopowder were measured as 4130 Oe and 82 emu/g respectively and it was confirmed that the nanopowder has both of the high coercive force of the hard magnetic phase and high saturation flux density of the soft magnetic phase.

Preparation of Magnet

The present invention also provides a method of preparing a magnet by using the core-shell structured nanoparticle having hard-soft magnetic heterostructure wherein a soft magnetic shell surrounds a hard magnetic core.

(1) Preparation of Bonded Magnet

Concretely, a bonded magnet is prepared by a method comprising the following steps: (i) preparing powder by dispersing the core-shell structured nanoparticle having hard-soft magnetic heterostructure; (ii) preparing a mixture by mixing thermosetting or thermoplastic synthetic resin and the above powder; and (iii) forming a bonded magnet by extruding or injecting the above mixture.

(2) Preparation of Sintered Magnet

A sintered magnet is prepared by a method comprising the following steps: (i) performing a magnetic field molding of the core-shell structured nanoparticle having hard-soft magnetic heterostructure prepared according to the above preparing method; and (ii) sintering the above molded body. Alternatively, one step process unifying the magnetic field molding and sintering corresponding to the above (i) and (ii) step may be applied. When carrying out the magnetic field molding, the loading direction of external magnetic field may be horizontal or vertical. For sintering process, at least one technique may be selected and applied from furnace sintering, spark plasma sintering, and microwave sintering and hot press.

The invention claimed is:

1. A method of preparing a core-shell structured nanoparticle having hard-soft heterostructure by using a sol-gel method, which comprises the following steps:

(i) obtaining a solution of slurry state comprising ferrite nanopowder and at least one selected from metal complex compound, metal salt, metal compound and metal nanoparticle;

(ii) altering the solution into a viscous gel by evaporating its solvent; and (iii) forming a nanoparticle by heating the gel.

2. A method of preparing a core-shell structured nanoparticle having hard-soft heterostructure by using a reverse micelle method, which comprises the following steps:

(i) obtaining and mixing a solution comprising metal salt, ferrite nanopowder, surfactant, hydrocarbon as a non-polar solvent, and distilled water; and (ii) forming a nanoparticle by drying the solution rapidly.

3. The method according to claim 1, further comprising performing thermal reduction of the prepared nanoparticle when a shell of the prepared nanoparticle is composed of a metal compound.

4. The method according to claim 1, wherein the solution of slurry state comprises ferrite nanopowder and at least one metal complex compound selected from iron-oleate (Fe-oleate) and iron-dodecanoate (Fe-dodecanoate).

5. The method according to claim 2, wherein the surfactant is at least one selected from sodium bis(2-ethylhexyl) sulfosuccinate, polyoxyethylene nonylphenyl ether, nonyl phenol ethosylate, and sodium dioctylsulfosuccinate.

6. The method according to claim 2, wherein the hydrocarbon is at least one selected from cyclohexane, trimethylpentane including isooctane, heptanes, octane, decane, carbon tetrachloride, and benzene.

7. A method of preparing a sintered magnet, comprising the following steps:

(i) performing magnetic field molding of the core-shell structured nanoparticle having hard-soft magnetic heterostructure; and (ii) sintering the molded body, wherein the core-shell structured nanoparticle is one where a soft magnetic shell surrounds a hard magnetic core, which comprises at least one ferrite selected from barium ferrite, strontium ferrite, and cobalt ferrite, and wherein the steps of (i) and (ii) are carried out simultaneously.

* * * * *